L. COATES & J. T. CRISWELL.
Butter-Print Presses.
No. 142,838. Patented September 16, 1873.
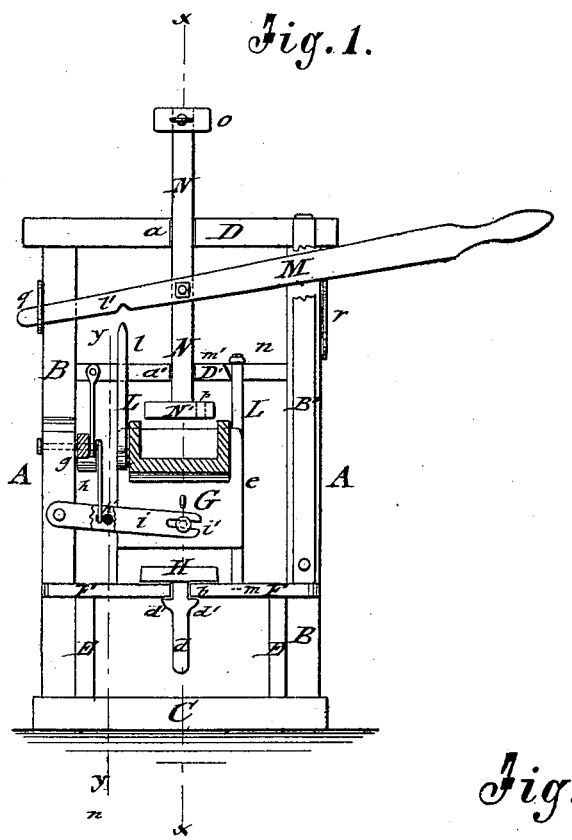
Witnesses.
Inventor.
L. Coates
J. T. Criswell
Per
Attorneys.

# UNITED STATES PATENT OFFICE.

LEWIS COATES AND JOEL T. CRISWELL, OF COLLAMER, PENNSYLVANIA.

IMPROVEMENT IN BUTTER-PRINT PRESSES.

Specification forming part of Letters Patent No. 142,838, dated September 16, 1873; application filed June 14, 1873.

*To all whom it may concern:*

Be it known that we, LEWIS COATES and JOEL T. CRISWELL, of Collamer, in the county of Chester and State of Pennsylvania, have invented a new and Improved Butter-Press, of which the following is a specification:

In the accompanying drawing, Figure 1 represents a front elevation of our improved butter-press, partly in section, on the line $c\,c$, Fig. 2; Fig. 2, a vertical transverse section of the same on the line $x\,x$, Fig. 1; Fig. 3, a detail vertical transverse section on the line $y\,y$, Fig. 1, to show lever arrangement of sliding box. Fig. 4 is a detail side view of main frame, to show stop arrangement to hold up follower-lever when not in use; and Fig. 5, a detail bottom view of the follower-block.

Similar letters of reference indicate corresponding parts.

The object of our invention is to furnish to farmers and dairymen an improved butter print or press, by which the butter may be quickly and evenly formed into cakes of required weight, and suitable print-marks thereon, without previous weighing. Our invention consists in a sliding box, into which the butter is introduced and pressed on a printing-block, by a follower block and lever, into suitable shape and weight.

In the drawing, A represents the frame of the butter-press, of wood or other suitable material, consisting of the strong upright side posts B and the base C. Posts B are connected laterally by top piece D, which is recessed at $a$ for guiding the follower shaft or stem. At suitable height above base C, and supported by additional brackets or posts E, are placed the horizontal pieces F, of suitable strength to carry the sliding box G. The front part of piece F is centrally recessed at $b$ for the rectangular printing-block H, which is placed therein by its downward-extending handle $d$, with side projections $d'$. The face of block H is provided with countersunk letters or other marks, which are to be imprinted on the butter. Block H is also slightly tapering upward to fit closely into sliding box G.

In large dairies the printing-block may be suitably pivoted, and its handle connected, by a slack string, to the sliding box, so that when the box is raised the block is tilted by the tightening of the string, and the butter-cake thrown off the block on a cloth or receptacle below. The position and weight of the handle carries the block back into its proper position for the descent of the box.

The sliding box G is of prismatic shape, with open top and bottom, and moves vertically up and down in the upright guide-posts L placed inside of main posts B on pieces F, and held by cross-piece D'. The sides of box G have projecting strips $e$ for guiding box G along posts L. An inclined mouth-piece, I, fits closely to the front part of box G, being attached thereto by hooks $f$ and eyes $f'$. The fresh butter is placed on piece I, and carried by the follower-block down on the printing-block H. The motion of the sliding box G is imparted by means of hand-lever $g$, pivoted, at $g'$, to main post B, which lever is connected, by a vertical rod, $h$, with the horizontal transverse rod $h'$, which engages the levers $i$, which are also pivoted to the side of main post B, and embrace with their bifurcated ends the lugs $d'$ of box G, lifting or lowering the same, as required. An upright piece, $l$, which is pivoted to the side of mouth I of box G, acts on a notch, $l'$, of the follower-lever M, and raises the same, together with box G, at each upward motion of lever $g$. The mouth I may be detached from box G, and also box G from the guide-posts L, as one of them is set loosely into a groove, $m$, of pieces F, and on cross-piece D'. The recess of post L into which piece D' is set is large enough to give full play to post L on lifting the same out of groove $m$. A recess, $m'$, of piece D', which inclines toward post L, allows the sideward motion of the lower part of post L, so that box G may be slipped out of the bifurcated ends of levers $i$, and be taken off for cleaning or repairing. On replacing box G and post L the latter is firmly set into groove $m$ by means of cam $n$, which is pivoted on piece D', and turned over the ends of post L. The cross-piece D' carries in a central recess, $a'$, corresponding to that of the top piece D, the follower-shaft N, which is pivoted to lever M. An adjustable regulating-stop, $o$, may be arranged either on the upper end of shaft N, or sidewise at post L, to arrest lever M, so that thereby a uniform quantity of butter is pressed in box G. The follower-block N' fits accurately into box G, and has a vent-hole, $p$, through which the surplus butter passes out on the descent of the follower. This hole $p$ may be provided with a slide arrangement for opening or closing the hole more or less. Lever M moves sidewise in staple $q$ of one main post, B, and along vertical guide-piece B', which is detachably connected to the other main post B. A curved pivoted plate, $r$, with a stop, $r'$, is applied in such a manner to the side of main post B that the sliding end of lever M pushes the same aside in its up and downward movements, but is kept in the upward position when passing beyond the upper projecting end of plate $r$.

The operation of the press is simple, as the butter in the sliding box is compressed by the follower, after which box and follower are raised and the printed butter taken off, the printing-block replaced, the sliding box lowered ready for the follower, and the forming of the next cake.

Having thus described our invention, we claim as new and desire to secure by Letters Patent—

1. The butter-press consisting of frame A, sliding box G, with mouth I and levers $g\ i$, block H, guide-posts L, follower N N', and lever M, substantially as and for the purpose described.

2. The combination of the printing-block A, having handle $d$, with guide-lugs $d'$ and the supporting piece or platform F, provided with the slot $b$, as shown and described.

3. The sliding box G, having mouth I, guide-strips $e$, pivoted arm $l$, links $i$, and lugs $i'$, combined as specified.

4. The combination of the follower-lever M, having notch $l'$, with the upright bar $e$ and box G, as and for the purpose specified.

5. The cross-piece D, having recess $m'$ and button $n$ to lock post L, as described.

6. The pieces D and D', with guide-recesses $a\ a'$, and follower-shaft N, having the regulating-stop $o$, combined as specified.

LEWIS COATES.
JOEL T. CRISWELL.

Witnesses:
 HARVEY REA,
 W. T. FULTON.